Patented Jan. 30, 1940

2,188,495

UNITED STATES PATENT OFFICE 2,188,495

METHOD FOR THE PRODUCTION OF TERPENE DERIVATIVES

Joseph N. Borglin, Wilmington, Del., assignor to Hercules Powder Company, Wilmington, Del., a corporation of Delaware No Drawing. Application March 23, 1938, Serial No. 197,602

12 Claims. (Cl. 260—454)

This invention relates to a method for the production of terpene thiocyanates, and the corresponding terpene compounds of selenium and tellurium.

The method in accordance with this invention comprises reacting an unsaturated terpene with thiocyanogen, selenocyanogen or tellurocyanogen to produce a terpene thiocyanate, a terpene selenocyanate or a terpene tellurocyanate.

In carrying out the method in accordance with this invention I find that it is convenient to prepare the thiocyanogen or the corresponding compound of selenium or tellurium by treating a solution of a metal thiocyanate or, similarly, a solution of a metal selenocyanate or a metal tellurocyanate such as, for example, a lead thiocyanate, a manganese thiocyanate, a copper thiocyanate, a mercury thiocyanate, etc., suspended in a suitable inert solvent for the terpene, with a halogen such as, for example, bromine, chlorine, iodine, etc., and then adding an unsaturated terpene directly to the solution. The terpene thiocyanate is then separated from the solution and purified by washing.

Suitable inert, terpene solvents suitable for this purpose are, for example, glacial acetic acid, ether, saturated petroleum hydrocarbons, such as, octane, petroleum ether, etc., chlorinated solvents such as, carbon tetrachloride, hexachlorethane, etc., aromatic hydrocarbons as, benzol, toluol, etc., and saturated terpenes, as, paramenthane, dihydroterpineol, etc.

The unsaturated terpenes which I may use may be, for example, terpene hydrocarbons, as, pinene, dipentene, terpinene, terpinolene, limonene, carene, alpha-terpinolene, beta-terpinolene, camphene, fenchene, menthene, allo-ocimine, gamma-terpinolene, etc., terpene esters, as, terpinyl acetate, terpinyl propionate, terpinyl butyrate, etc., terpene ethers, as, terpinylmethyl ether, monoterpinylglycol ether, diterpinylglycol ether, etc., terpene alcohols, as, alpha-terpineol, beta-terpineol, etc., or commercial mixtures of unsaturated terpenes, as turpentine, pine oil, etc.

In carrying out this method it is desirable to utilize an excess of the thiocyanogen, selenocyanogen, or tellurocyanogen, so that the terpene will be entirely reacted. Hence, it is desirable to utilize an excess of the metal thiocyanate, metal selenocyanate, or metal tellurocyanate which forms the source of the thiocyanogen, selenocyanogen or tellurocyanogen, respecticely. The amount of the halogen added to the thiocyanate, selenocyanate, or tellurocyanate will desirably be just an equivalent quantity or very slightly less than an equivalent amount. The exact amount to be added can readily be determined by the disappearance of color from the solution, as shown in the examples given hereinafter.

The metal of the metal thiocyanate, metal selenocyanate, or metal tellurocyanate and the halogen used to produce the thiocyanogen, selenocyanogen, or tellurocyanogen, respectively, will desirably be selected so that the metal halide formed as a by-product of the reaction will be insoluble in the terpene solvent utilized. By such a selection I secure a precipitation of the by-product metal halide which may be conveniently filtered out of the solution. Thus, I simplify the purification of the desired terpene thiocyanate, terpene selenocyanate or terpene tellurocyanate.

The reaction in accordance with this invention will desirably be carried out at a temperature within the range of about 0° C. to about 35° C. and preferably at a temperature of about 20° C. to about 25° C. Thus, it may conveniently be carried out at room temperature.

The method in accordance with this invention is further illustrated by the following examples:

Example I

Pinene thiocyanate was prepared by adding 129 parts by weight of lead thiocyanate to 500 parts by weight of glacial acetic acid, to which was slowly added 65 parts by weight of bromine. When the reaction was complete and the solution no longer colored, 100 parts by weight of pinene was slowly added to this solution. The resulting solution was allowed to stand overnight, and then filtered. The pinene thiocyanate was precipitated from the filtrate by the addition of water, and dried. The pinene thiocyanate so recovered analyzed 10.6% sulfur, which represents a 64% yield of thiocyanate.

Example II

Terpineol thiocyanate was prepared, following the procedure of Example I, with the substitution of alpha terpineol for the pinene. The product so produced analyzed 9.6% sulfur showing it to contain 65.5% of terpineol thiocyanate.

Example III

Allo-ocimine thiocyanate was prepared by adding 60 parts by weight of bromine to 100 parts by weight of lead thiocyanate in 300 parts by weight of glacial acetic acid. When the reaction had gone to completion, 100 parts by weight of allo-ocimine was added to the solution and allowed to stand overnight. The solution was then filtered and washed with water. The 106 parts by weight of the product which was recovered analyzed 10.5% sulfur, corresponding to a 70% yield of allo-ocimine thiocyanate.

*Example IV*

The thiocyanate of a terpinylmethyl ether (the ether prepared by the addition of methanol to pinene in the presence of sulfuric acid) was prepared by adding 60 parts by weight of lead thiocyanate to 250 parts by weight of glacial acetic acid and 25 parts by weight of bromine. When the bromine had completely reacted, 50 parts by weight of terpinylmethyl ether was slowly added and the solution allowed to stand overnight. It was then filtered, the filtrate washed with water to remove the acetic acid, and the recovered product dried. The product analyzed 9.2% sulfur, showing it to contain 65% thiocyanate.

*Example V*

Sixty-five parts by weight of lead thiocyanate was suspended in 250 parts by weight of ethyl ether, to which suspension was slowly added 32 parts by weight of bromine. When all the bromine had reacted, 50 parts by weight of pinene was slowly added and the mixture allowed to stand overnight. The reaction mixture was then filtered and the filtrate washed with water. The product was then recovered by evaporating the ethyl ether to leave a residue of 44 parts by weight of the product, which analyzed 16.6% sulfur, showing it to be approximately 99% pinene thiocyanate.

*Example VI*

One hundred eighty parts by weight of bromine was slowly added to 375 parts by weight of lead thiocyanate in 1500 parts by weight of glacial acetic acid. When all the bromine had reacted, 300 parts by weight of pine oil was slowly added to the mixture, the mixture allowed to stand overnight, filtered, washed with water to remove the acetic acid, and dried. The product analyzed 9.2% sulfur, showing it to contain about 65% of a mixed terpene thiocyanate.

The terpene thiocyanates, terpene selenocyanates and terpene tellurocyanates prepared by the method in accordance with this invention are valuable insecticides. They are, in addition, useful as intermediates for the preparation of other terpene derivatives.

The details and examples given herein are by way of illustration and not by way of limitation of the invention as broadly described and claimed.

What I claim and desire to protect by Letters Patent is:

1. A method for the production of a terpene compound having the type formula R—(CNX), in which R is a terpene group and X is an element of the group consisting of sulfur, selenium, and tellurium, which consists of reacting an unsaturated terpene with a compound having the type formula XCN, in which X is an element of the group consisting of sulfur, selenium and tellurium, and recovering the resulting terpene derivative.

2. A method for the production of a terpene thiocyanate, which consists of reacting an unsaturated terpene with thiocyanogen, and recovering the resulting terpene thiocyanate.

3. A method for the production of a terpene thiocyanate, which consists of reacting an unsaturated terpene hydrocarbon with thiocyanogen, and recovering the resulting terpene thiocyanate.

4. A method for the production of a terpene thiocyanate, which consists of reacting an unsaturated terpene alcohol with thiocyanogen, and recovering the resulting terpene thiocyanate.

5. A method for the production of a terpene thiocyanate, which consists of reacting an unsaturated terpene ether with thiocyanogen, and recovering the resulting terpene thiocyanate.

6. A method for the production of a terpene thiocyanate, which consists of reacting pinene with thiocyanogen, and recovering the resulting pinene thiocyanate.

7. A method for the production of a terpene thiocyanate, which consists of reacting a terpineol with thiocyanogen, and recovering the resulting terpineol thiocyanate.

8. A method for the production of a terpene thiocyanate, which consists of reacting a glycol-terpinyl ether with thiocyanogen, and recovering the resulting terpene thiocyanate.

9. A method for the production of a terpene compound having the type formula R—(CNX), in which R is a terpene group and X is an element of the group consisting of sulfur, selenium and tellurium, which consists of reacting a compound having the type formula Me—(CNX), in which Me is a metal and X is an element of the group consisting of sulfur, selenium and tellurium, with a halogen in the presence of a suitable inert solvent for terpenes, adding an unsaturated terpene compound thereto, and recovering a terpene thiocyanate therefrom.

10. A method for the production of a terpene compound having the type formula R—(CNX), in which R is a terpene group and X is an element of the group consisting of sulfur, selenium and tellurium, which consists of reacting a compound having the type formula Me—(CNX), in which Me is a metal which forms an insoluble halide and X is an element of the group consisting of sulfur, selenium and tellurium, with a halogen which forms an insoluble halide with the metal of the compound Me—(CNX), in the presence of a suitable inert solvent for terpenes adding an unsaturated terpene compound thereto, separating the resulting precipitated metal halide from the solution and then separating a terpene thiocyanate from the said solvent.

11. A method for the production of a terpene thiocyanate, which consists of reacting a metal thiocyanate, the metal of which forms an insoluble halide, with a halogen which forms an insoluble compound of the said metal, in the presence of a suitable inert solvent for terpenes adding an unsaturated terpene compound thereto, separating the precipitated metal halide from the solution and then separating a terpene thiocyanate from the said solvent.

12. A method for the production of a terpene thiocyanate, which consists of reacting lead thiocyanate suspended in an inert solvent for terpenes with bromine, adding an unsaturated terpene thereto, separating the precipitated lead bromide from the solution and then separating a terpene thiocyanate from the said solvent.

JOSEPH N. BORGLIN.